United States Patent [19]
Boden et al.

[11] Patent Number: 5,523,008
[45] Date of Patent: Jun. 4, 1996

[54] POLAR GRAFTED POLYOLEFINS, METHODS FOR THEIR MANUFACTURE, AND LUBRICATING OIL COMPOSITIONS CONTAINING THEM

[75] Inventors: Frederick J. Boden, Somerset; Richard P. Sauer, North Plainfield; Irwin L. Goldblatt, Edison; Michael E. McHenry, Washington, all of N.J.

[73] Assignee: Castrol Limited, Swindon, England

[21] Appl. No.: 327,508

[22] Filed: Oct. 21, 1994

[51] Int. Cl.⁶ .................. C10M 149/10; C08F 279/02
[52] U.S. Cl. .............. 252/50; 252/51.5 R; 252/51.5 A; 525/279; 525/281; 525/282; 525/283; 525/293; 525/296; 525/309; 525/315
[58] Field of Search ................... 252/50, 51.5 R, 252/51.5 A

[56] References Cited

U.S. PATENT DOCUMENTS

| | | | |
|---|---|---|---|
| 4,068,058 | 1/1978 | Engel et al. | 252/51.5 A |
| 4,085,055 | 4/1978 | Durand et al. | 252/50 |
| 4,092,255 | 5/1978 | Chapelet et al. | 252/50 |
| 4,229,311 | 10/1980 | Wenzel et al. | 252/50 |
| 4,519,929 | 5/1985 | O'Brien et al. | 252/51.5 A |
| 4,699,723 | 10/1987 | Kapuscinski et al. | 252/47 |
| 4,810,754 | 3/1989 | McCrary | 252/50 |
| 4,863,623 | 9/1989 | Nalesnik | 252/50 |
| 4,952,637 | 8/1990 | Kapuscinski et al. | 525/279 |
| 5,035,820 | 7/1991 | Rhodes et al. | 252/50 |
| 5,205,949 | 4/1993 | Nalesnik et al. | 252/50 |
| 5,298,565 | 3/1994 | Lange et al. | 525/279 |
| 5,308,523 | 5/1994 | DeRosa et al. | 252/51.5 A |
| 5,312,556 | 3/1994 | Chung et al. | 252/51.5 A |
| 5,328,624 | 6/1994 | Chung | 252/51.5 A |
| 5,356,551 | 10/1994 | Chung et al. | 252/51.5 A |
| B1 4,146,489 | 11/1983 | Stambaugh | 252/50 |

FOREIGN PATENT DOCUMENTS

| | | |
|---|---|---|
| 0199453A3 | 10/1986 | European Pat. Off. . |
| 0400867A1 | 12/1990 | European Pat. Off. . |
| 0440506A3 | 8/1991 | European Pat. Off. . |
| 1511520 | 5/1978 | United Kingdom . |
| 1558991 | 1/1980 | United Kingdom . |
| 1601079 | 10/1981 | United Kingdom . |
| WO91/13952 | 9/1991 | WIPO . |
| WO92/15622 | 9/1992 | WIPO . |

*Primary Examiner*—Ellen M. McAvoy
*Attorney, Agent, or Firm*—McAndrews, Held & Malloy, Ltd.

[57] ABSTRACT

A grafted polyolefin containing at least about 13 moles of N-vinylimidazole or other ethylenically-unsaturated nitrogen-containing and/or oxygen-containing monomers per mole of a grafted polyolefin backbone is disclosed. The graft polyolefin has a weight average molecular weight of from about 20,000 to about 500,000 and a polydispersity of less than about 10. The grafted polyolefin can alternatively be defined as containing more than about 1.2% by weight of grafted monomer on a polyolefin. Also described is a lubricating oil comprising a lubricant base oil and a grafted polyolefin as described above. Also described is a method of making a dispersant-viscosity index improver. N-vinylimidazole or other ethylenically unsaturated nitrogen-containing and/or oxygen-containing monomers and a graftable polyolefin are reacted with enough of an initiator to graft at least about 13 moles of the monomer to each mole of the polyolefin.

13 Claims, No Drawings

POLAR GRAFTED POLYOLEFINS, METHODS FOR THEIR MANUFACTURE, AND LUBRICATING OIL COMPOSITIONS CONTAINING THEM

The present invention relates to novel grafted polymers with polyolefin backbones (preferably having pendant unsaturation) grafted with ethylenically unsaturated nitrogen-containing and/or oxygen-containing monomers.

The present invention further relates to methods for manufacturing these novel grafted polyolefins. The invention still further relates to lubricating oil compositions containing these novel grafted polyolefins as viscosity index improvers.

BACKGROUND OF THE INVENTION

Grafted copolymers of a nitrogenous, heterocyclic monomer with a pendant ethylenically unsaturated moiety and a polyolefin have previously been proposed for use in lubricating oils as viscosity index improving (VII) agents and as dispersants for keeping the slurry of insoluble materials in the crankcase of an internal combustion engine in suspension during cold running of the engine. Among many graft polymers suggested for this use are ethylene-propylene polymers, grafted with N-vinylimidazole or other monomers. See U.S. Pat. No. 4,092,255.

Another material which has been suggested for use as both a viscosity index improver and a dispersant is a polymer containing N-vinyl pyrrolidone and an alkyl methacrylate. U.S. Pat. No. 4,146,489, col. 1, lines 51–62.

Previous dispersant/viscosity index improvers ("DVII's") have typically provided an ADT (asphaltene dispersancy test) value of from about 2 to about 4.

Grafted polyolefins for use as lubricating oil additives have previously been prepared by dissolving the selected polyolefin in a solvent (which may be a lubricating oil base stock), adding a peroxide as a free radical generator (also referred to in this specification as an initiator), holding the mixture at an elevated temperature to form active sites on the polyolefin, adding the graft monomer, and allowing the mixture to react at an elevated temperature for long enough to form the desired graft polyolefin. U.S. Pat. No. 4,092,255, col. 4, line 5.4, to col. 5, line 12. That patent states that the polydispersity of the grafted polyolefin is less than that of the starting polymer, which is said to improve its shearing stability. Col. 6, lines 17–20.

The prior art also suggests that the graft reaction to form a dispersant/VII grafted polyolefin can be controlled to avoid by-products by combining the polyolefin backbone, graft monomer, and initiator at a temperature below the initiation temperature of the initiator, then heating the mixture to above that initiation temperature to begin the reaction. U.S. Pat. No. 4,146,489, issued Mar. 27, 1979. Example 1 of the '479 patent suggests that the initiation temperature of di-t-butyl peroxide is between 160° C. and 170° C. Addition of the initiator in two stages is suggested in Example 4 of the same patent. A graft polymer containing 1–10% by weight, preferably 2–6% by weights most preferably about 3% by weight of the grafted monomer is taught. '489 patent, col. 3, lines 11–15.

One problem with prior grafted polyolefins is their limited shear stability—the ability to withstand extensive shearing, as in an internal combustion engine, without losing potency as viscosity-index improving additives. U.S. Pat. No. 4,146,489, col. 5, lines 48–58, states that: "During the grafting reaction, noticeable thickening takes place, and evaluation of the grafted polyolefin indicates that shear stability deteriorates during the grafting reaction. This very likely results from crosslinking that may occur as part of the reaction. Although it is possible to eliminate this crosslinking, the products so prepared generally are inferior dispersants. Hence, it appears to be inherent to some extent in the graft process of this invention that to obtain optimum dispersancy, some compromise in shear stability is necessary."

The '489 patent also points out that the shear stability of the grafted copolymer can be improved by mechanical or thermal degradation of the polymer to reduce the content of long-molecular-weight species which are readily broken down by such processes. However, it is not desirable to carry out the time-consuming and expensive processes necessary to mechanically or thermally degrade the polymer.

Another manner proposed for preventing side reactions in the grafting process, which are said to include cross-linking of polymer chains, homopolymerization of the graft monomer, or functionalization of the grafted polymer, is to run the reaction at a relatively high temperature, such as 190° C. or more if a t-butyl peroxide catalyst is used. This expedient is also said to allow the proportion of grafted monomer in the resulting product to be increased, as well. U.S. Pat. No. 4,810,754, col. 2, lines 19–43.

A grafting reaction has been carried out, according to Example 1 of U.S. Pat. No. 4,810,754, by adding the initiator (di-t-butyl peroxide) and the graft monomer (2-vinyl pyridine—molecular weight 105.14) over a period of 45 minutes to an ethylene-propylene polyolefin reaction mixture maintained in a solvent mineral oil at 190° C. The resulting grafted polymer was said to contain as much as 0.17% nitrogen by one analysis. This amounts to a 1.3% by weight vinylpyridine monomer grafting level.

OBJECTIVES OF THE INVENTION

One objective of the invention is to provide novel grafted polymers with polyolefin backbones (preferably having pendant unsaturation) grafted with ethylenically unsaturated nitrogen or oxygen-containing monomers.

An additional objective of the present invention is to provide a dispersant/viscosity index improver ("DVII") which has an ADT dispersancy of from about 8 to about 32—higher than the ADT dispersancies of previous nitrogenous grafted polyolefin DVII's.

Another objective of the invention is to provide such grafted polyolefins which contain higher molar proportions of the grafted monomer to the backbone than previously known grafted polyolefins—such as a 13:1, 15:1, 25:1, 50:1, or even higher graft monomer: backbone molar ratio—without substantially increasing the molecular weight or decreasing the shear stability of the grafted polyolefin versus the ungrafted polyolefin starting materials.

Still another objective of the invention is to provide lubricating oil compositions containing these novel grafted polyolefins in amounts effective to function both as viscosity index improvers and as dispersants.

Still another objective of the invention is to provide such grafted polyolefins which minimally require use of additives which increase the low temperature viscosity of oil blends, which therefore permits use of a higher-viscosity base stock which provides better lubrication at high operating temperatures.

Another objective of the invention is to provide such grafted polyolefins which, when blended with other engine oil components yield, formulations with higher viscosity base stock and, hence, containing less volatile constituents.

An additional objective of the invention is to provide methods for manufacturing these novel grafted polyolefins.

One or more of the preceding objectives, or one or more other objectives which will become plain upon consideration of the present specification, are satisfied at least in part by the invention described herein.

SUMMARY OF THE INVENTION

One aspect of the invention, which satisfies one or more of the above objectives, is a grafted polyolefin containing at least about 13 moles of N-vinylimidazole per mole of a polyolefin backbone. The grafted polyolefin can alternatively be defined as containing more than about 1.2% by weight of N-vinylimidazole grafts on an polyolefinic backbone. The polyolefin has a weight average molecular weight of from about 20,000 to about 500,000 and a polydispersity of less than about 10.

Another aspect of the invention is a lubricating oil comprising a hydrocarbon base oil and a grafted polyolefin as described above. The grafted polyolefin functions as a viscosity index improver, and has the property of raising the viscosity index of the lubricating oil blend by at least about 20 points when used at a 1 wt.% solids concentration in the blend. (The viscosity index improver may, however, be used in an amount which is more or less than 1% by weight solids of a lubricating oil composition.) Such a lubricating oil employs both the superior dispersancy and the viscosity improving properties of the grafted polyolefin, so less of the oil composition is occupied by dispersant ingredients than in prior compositions. For example, a 10W-30 lubricating oil can be formulated which employs more of a low-volatility conventional base stock which consequently has a higher viscosity than previous formulations. This allows the formulator greater latitude to formulate a multi-viscosity composition which will stay in grade, provide equal or superior performance, and yet contain less volatiles from the base stock.

A significant benefit of the present invention is that the reduction in the amount of conventional dispersants dramatically increases the wear resistance of the composition in an internal combustion engine.

Another aspect of the invention is a method of making a dispersant/viscosity index improver. According to this invention, N-vinylimidazole and a polyolefin having graftable unsaturation are provided in a mole ratio of at least about 1:13. (Typically, not all of the N-vinylimidazole will react with the polymer, so a much greater molar proportion of N-vinylimidazole than 1:13—such as a mole ratio of 1:30 or more—will generally be required.) Enough of an initiator is provided to graft at least about 13 moles of the N-vinylimidazole to each mole of the polymer.

The polymer is dissolved in a solvent, forming a solution. The N-vinylimidazole is added to the solution, and the initiator is added to the dispersion at a rate of addition of less than about 20% of the charge per minute, alternatively less than about 1%, of the amount sufficient to graft at least about 13 moles of the N-vinylimidazole to each mole of the polymer. The reaction temperature is maintained at a level which gives rise to a satisfactory initiation rate of reaction. In one embodiment, the N-vinylimidazole and the initiator are each added at a uniform, relatively slow rate during the reaction. The resulting grafted polyolefin includes at least about 13 moles of grafted N-vinylimidazole per mole of the polyolefin, and has a kinematic viscosity at 100° C. of less than about 13,000 centistokes when used at 12.5% by weight (solids) in oil.

DETAILED DESCRIPTION OF THE INVENTION

While the invention will be described in connection with one or more preferred embodiments, it will be understood that the invention is not limited to those embodiments. On the contrary, the invention includes all alternatives, modifications, and equivalents as may be included within the spirit and scope of the appended claims.

The novel grafted polyolefin according to the present invention is made by reacting a polymer (preferably having pendant ethylenic unsaturation) and a polar, ethylenically unsaturated, preferably nitrogen-containing, preferably heterocyclic monomer, in the presence of an initiator. The reaction may be carried out on the solid polymer in an extrusion reactor, in the molten polymer, or in a solvent.

Reaction Materials

The following are exemplary polymers, graft monomers, initiators, and solvents contemplated for use herein to make the present grafted polyolefin.

Polymers

A wide variety of polyolefins (preferably having pendant unsaturation) are contemplated for use herein as a backbone for grafting. Exemplary polymers contemplated for use herein include the polyolefins suggested by U.S. Pat. No. 4,092,255, col. 1, lines 29–32: polyisobutene, polyalkylstyrenes, partially hydrogenated polyolefins of butadiene and styrene, and amorphous polyolefins of ethylene and propylene. EPDM (ethylene/propylene/diene monomer) rubbers are also contemplated for use herein.

Particular materials contemplated for use herein include ethylene/propylene polyolefins containing from about 30% to about 80% ethylene and from about 70% to about 20% propylene moieties by number, optionally modified with from 0% to about 9% diene monomers. Exemplary diene monomers are 1,4-butadiene, isoprene, 1,4-hexadiene, dicyclopentadiene, 2,5-norbornadiene, ethylidene-norbornene, the dienes recited in U.S. Pat. No. 4,092,255, col. 2, lines 36–44 (which are incorporated by reference here), or combinations of more than one of them.

The polyolefins contemplated herein may have weight average molecular weights of from about 20,000 to about 500,000, and polydispersities of from about 1 to about 15.

Specific materials which are contemplated for use herein include: ORTHOLEUM 2052 or 2053 vulcanizable elastomers, which are polymers of principally ethylene, propylene, and 1,4-hexadiene, (and 2,5-norbornadiene) having a CAS Number of 25190-87-8, which are believed to have weight average molecular weights ranging from 100,000 to 120,000, with an overall average of about 114,000 (U.S. Pat. No. 4,519,929 and a polydispersity of about 2.5, sold as lubricant assistants by E. I. Du Pont de Nemours & Co., Wilmington, Del.; Mitsui VISNEX polymers, which are terpolymers of ethylene, propylene, and ethylidene-norbornene, CAS No. 25038-36-2, sold by Mitsui Petrochemical Industries, Ltd., Tokyo, Japan; NORDEL hydrocarbon rubbers, CAS No. 25038-37-1, which are terpolymers of ethylene, propylene, and 1,4-hexadiene sold by E. I. Du Pont de Nemours & Co., Wilmington, Del.; VISTALON ethylene/propylene polyolefins, sold by Exxon Chemical Americas, Houston, Tex.; combinations of the above materials; and other, similar materials.

Graft Monomers

Broadly, any of the monomers previously used to graft polyolefins are also contemplated for use herein. For example, the graft monomers recited in U.S. Pat. No. 4,146,489, col. 4, lines 2 through 41; U.S. Pat. No. 4,092,255, from col. 2, line 45, to col. 3, line 47; and U.S. Pat. No. 4,810,754, from col. 3, line 24, to col. 4, line 4, are hereby incorporated herein by reference.

Specific graft monomers contemplated for use herein include the following:

N-vinylimidazole;

1-vinyl-2-pyrrolidinone;

C-vinylimidazole;

N-allylimidazole;

1-vinylpyrrolidone;

2-vinylpyridine;

4-vinylpyridine;

N-methyl-N-vinyl-acetamide;

di-allyl formamide;

N-methyl-N-allyl formamide;

N-ethyl-N-allyl formamide;

N-cyclohexyl-N-allyl formamide;

4-methyl-5-vinyl thiazole;

N-allyl di-iso-octyl phenothiazine;

2-methyl-1-vinylimidazole 3-methyl-1-vinylpyrazole

N-vinylpurine

N-vinylpiperazines

N-vinylsuccinimide

Vinylpiperidines

Vinylmorpholines as well as combinations of those materials or other, similar materials. More broadly, any oxygen- and/or nitrogen-containing ethylenically unsaturated, aliphatic or aromatic monomers having from 2 to about 50 carbon atoms are contemplated for use as graft monomers herein.

Initiators

Broadly, any free-radical initiator capable of operating under the conditions of the present reaction is contemplated for use herein. Representative initiators are disclosed in U.S. Pat. No. 4,146,489, col. 4, lines 45–53, which is incorporated here by reference. Specific initiators contemplated herein include alkyl, dialkyl and aryl peroxides, for example:

di-t-butyl peroxide;

dicumyl peroxide;

t-butyl-cumyl peroxide;

t-butyl perbenzoate;

t-amyl perbenzoate;

t-butyl-peroxy acetate;

t-butyl peroxy benzoate;

benzoyl peroxide;

di-t-butyl peroxy phthalate;

2,5,-dimethyl-2,5,-di(t-butyl peroxy) hexane;

2,5,-dimethyl-2,5,-di(t-butyl peroxy)hexyne;

and combinations thereof; azo initiators, for example:

butanenitrile,2-methyl,2,2'-azobis;

propanenitrile,2-methyl,2,2'-azobis;

2,2'-azobis(2,4-dimethylpentane nitrile);

1,1'-azobis(cyclohexanecarbonitrile);

azoisobutyronitrile (AIBN);

and combinations thereof; and other similar peroxycarboxy materials.

Each such initiator commonly has a characteristic minimum temperature, above which it will readily initiate a reaction and below which initiation will proceed more slowly or not at all. Consequently, the minimum reaction temperature is commonly dictated by the effective characteristic minimum initiation temperature of the initiator.

Solvents

One category of solvents useful herein is that of volatile solvents which are readily removable from the grafted polyolefin after the reaction is complete. Any solvent may be used which can disperse or dissolve the remaining components of the reaction mixture and which will not participate appreciably in the reaction or cause side reactions to a material degree. Exemplary solvents of this type include straight chain or branched aliphatic or alicyclic hydrocarbons, such as n-pentane, n-heptane, i-heptane, n-octane, i-octane, nonane, decane, cyclohexane, dihydronaphthalene, decahydronaphthalene (sold, for example, under the trademark DECALIN by E. I. Du Pont de Nemours & Co., Wilmington, Del.), and others. Aliphatic ketones (for example, acetone), ethers, esters, etc., and mixtures thereof are also contemplated as solvents herein. Nonreactive halogenated aromatic hydrocarbons such as chlorobenzene, dichlorobenzene, di-chlorotoluene and others are also useful as solvents.

Another category of solvents useful herein is a base oil stock which has a low aromatic content and which will be suitable for incorporation into a final lubricating oil product. Any base oil may be used which can disperse or dissolve the remaining components of the reaction mixture without materially participating in the reaction or causing side reactions to an unacceptable degree. Specifically, hydrocracked base oils, base oils naturally containing low levels of aromatic constituents, and fluid poly-α-olefins are contemplated for use herein. Aromatic constituents should be kept to low levels (if present at all), since aromatic materials may be reactive with each other or other reaction components, particularly in the presence of initiators. The other reaction components thus may either be wasted, or produce unwanted by-products, unless the presence of aromatic constituents is small. Use of base stocks having aromatic constituents, while being less than optimum, are not excluded under this disclosure.

The level of aromatic constituents in a refined petroleum oil is sometimes expressed as the weight percentage of molecular species containing any proportion of aromatic carbon atoms, and other times is expressed as the weight percentage of only the aromatic carbon atoms. The former value can be much greater than the latter value. In this specification, the "level of aromatic constituents" is defined as the weight percentage of molecular species containing any proportion of aromatic carbon atoms. The petroleum oil solvents contemplated here are those containing less than about 20% by weight of molecular aromatic impurities, alternatively less than about 5% by weight of such impurities, alternatively less than about 1% of such impurities, alternatively about 0.2% or less of such impurities.

Solvents of this type include the following materials: PETROCANADA HT 70 or HT 160 straight cut oil stocks having about 0.2% aromatic constituents, sold for use in lubricating oils by Petro-Canada, Calgary, Alberta; 100 VIS LP SOLVENT NEUTRAL base oil, a material having about 15% by weight aromatic molecules but only roughly 3% by weight of aromatic carbon, atoms, sold as a petroleum lubricating oil base stock by Exxon Company, U.S.A., Houston, Tex.; CHEVRON NEUTRAL OIL 100R, sold by Chevron USA Products Co., San Francisco, Calif.; low aromatic content hydrotreated oils such as RLOP from Chevron; MOBIL SHF 61 synthetic poly-alpha-olefin base oil, sold by Mobil Oil Co., Fairfax, Va.; HPO-100, HPO-130, HPO-145, and HPO-170 blended cut petroleum hydrocarbon oils, sold by Sun Refining and Marketing Co., Philadelphia, Pa.; DRAKEOL 19 mineral oil, sold by Penreco, Karns City, Pa.; high aromatic content oils having aromatic contents from about 10–20 wt %. such as Exxon 130N solvent-treated oil and hydrogen treated 220 Solvent Neutral base oil from Delphi Petroleum Inc., manufactured at Repsol's Puertollano refinery; moderately high aromatic content oils such as Exxon naphthenic oil, for which the aromatic content is about 5–12 wt %; blends of any of those individual oils; and others.

Also contemplated for use herein are oils prepared by sulphonation technology like Witco LMW Co-oil R-211-0, for which the aromatic content is about 0.1–5 wt %. Further contemplated for use herein are no aromatic content oils, which are synthetic lubricant base stocks like PAO.

Reaction Conditions

The present reaction can be carried out as follows. The polyolefin to be grafted is provided in fluid form. For example, the polymer may be ground and dissolved in a reaction solvent, which may be a base oil for a lubricating composition or another suitable solvent. This step can be carried out under an inert gas blanket, or with an inert gas purge, at a temperature lower than the reaction temperature, typically from 60° C. to about 120° C., for example, about 100° C. The mixing temperature will normally be less than the reaction temperature. Holding the mixture at a higher temperature may degrade the components while they are still exposed to some degree to oxygen from the atmosphere.

The reaction mixture can also be prepared as a melt of the desired polymer, with or without any added solvent or plasticizer.

The reaction mixture thus formed is placed in a suitable reactor which is purged or blanketed with an inert gas (which may be, for example, nitrogen, carbon dioxide, helium, or argon). A tank reactor may be used or, particularly if the reaction is carried out using a molten polymer, an extrusion reactor may be used.

The polymer solution or melt is heated to the desired reaction temperature. At a minimum, the reaction temperature should be sufficient to consume substantially all of the selected initiator during the time allotted for the reaction. For example, if DTBP is used as the initiator, the reaction temperature should be greater than about 160° C., alternatively greater than about 165° C., alternatively greater than about 170° C., alternatively greater than about 175° C., alternatively about 170° C. alternatively about 175° C. alternatively less than about 175° C., alternatively less than about 180° C., alternatively less than about 185° C., alternatively less than about 190° C., alternatively less than about 195° C., alternatively less than about 200° C.

Different initiators work at different rates according to the reaction temperature, and thus will require adjustments of the reaction temperature.

After the reaction solution has reached the selected reaction temperature, the purge can be redirected to flow over the surface of the reaction mixture. At this time the reactants are ready to be added.

The contemplated proportions of the graft monomer to the polymer and reaction conditions are selected so that an effective percentage or most or all of the molecules of the monomer will graft directly onto the polymer, rather than forming dimeric, oligomeric, or homopolymeric graft moieties or entirely independent homopolymers. At the same time, a high loading of the graft monomer onto the polymeric backbone is contemplated. The alternatively contemplated minimum molar proportions of the graft monomer to the starting polymer are as follows:

at least about 13 moles,
alternatively at least about 14 moles,
alternatively at least about 15 moles,
alternatively at least about 16 moles,
alternatively at least about 17 moles,
alternatively at least about 18 moles,
alternatively at least about 19 moles,
alternatively at least about 20 moles,
alternatively at least about 22 moles,
alternatively at least about 24 moles,
alternatively at least about 26 moles,
alternatively at least about 28 moles,
alternatively at least about 30 moles,
alternatively at least about 40 moles,
alternatively at least about 50 moles,
alternatively at least about 60 moles,
alternatively at least about 70 moles,
alternatively at least about 80 moles,
alternatively at least about 100 moles, of the graft monomer per mole of the starting polymer. The contemplated maximum molar proportions of the graft monomer to the starting polymer are as follows:

at most about 20 moles,
alternatively at most about 22 moles,
alternatively at most about 24 moles,
alternatively at most about 26 moles,
alternatively at most about 28 moles,
alternatively at most about 30 moles,
alternatively at most about 40 moles,
alternatively at most about 50 moles,
alternatively at most about 60 moles,
alternatively at most about 70 moles,
alternatively at most about 80 moles,
alternatively at most about 100 moles,
alternatively at most about 110 moles,
alternatively at most about 120 moles, or more of the graft monomer per mole of the starting polymer.

The graft monomer may be introduced into the reactor all at once, in several discrete charges, or at a steady rate over an extended period. The desired minimum rate of addition of the graft monomer to the reaction mixture is selected from:

at least about 0.1%,
alternatively at least about 0.5%,
alternatively at least about 1%,
alternatively at least about 1.2%,
alternatively at least about 1.4%,
alternatively at least about 1.6%,
alternatively at least about 1.8%, alternatively at least about 2%,
alternatively at least about 2.2%,
alternatively at least about 2.4%,
alternatively at least about 2.6%,
alternatively at least about 2.8%,
alternatively at least about 3%,
alternatively at least about 3.2%,
alternatively at least about 3.4%,
alternatively at least about 3.6%,
alternatively at least about 3.8%,
alternatively at least about 4.0%,
alternatively at least about 4.5%,
alternatively at least about 5%,
alternatively at least about 20%,
of the necessary charge of graft monomer per minute. The monomer can be added at a substantially constant rate, or at a rate which varies with time. Any of the above values can represent an average rate of addition or the minimum value of a rate which varies with time.

The desired maximum rate of addition is selected from:
at most about 0.1%,
alternatively at most about 0.5%,
alternatively at most about 1%,
alternatively at most about 1.2%,
alternatively at most about 1.4%,
alternatively at most about 1.6%,
alternatively at most about 1.8%,
alternatively at most about 2%,
alternatively at most about 2.2%,
alternatively at most about 2.4%,
alternatively at most about 2.6%,
alternatively at most about 2.8%,
alternatively at most about 3%,
alternatively at most about 3.2%,
alternatively at most about 3.4%,
alternatively at most about 3.6%,
alternatively at most about 3.8%,
alternatively at most about 4.0%,
alternatively at most about 4.5%,
alternatively at most about 5%,
alternatively at most about 20%,
alternatively at most about 100%
of the necessary charge of graft monomer per minute. Any of the above values can represent an average rate of addition or the maximum value of a rate which varies with time. The graft monomer may be added neat, in solid or molten form, or cut back with a solvent.

The contemplated proportions of the initiator to the monomer and the reaction conditions are selected so that at least many and ideally all of the molecules of the monomer will graft directly onto the polymer, rather than forming dimeric, oligomeric, or homopolymeric graft moieties or entirely independent homopolymers. The alternatively contemplated minimum molar proportions of the initiator to the graft monomer are from about 0.05:1 to about 1:1.

The initiator can be added before, with or after the monomer, so the amount of unreacted initiator which is present at any given time is much less than the entire charge, and preferably a small fraction of the entire charge. In one embodiment, the initiator may be added after all the monomer has been added, so there is a large excess of both the monomer and the polymer present during substantially the entire reaction. In another embodiment, the initiator may be added along with the monomer, either at the same rate (measured as a percentage of the entire charge added per minute) or at a somewhat faster or slower rate, so there is a large excess of the polymer to unreacted initiator, but so the amount of the unreacted monomer is comparable to the amount of unreacted initiator at any given time during the addition.

The initiator may be introduced into the reactor in several (or, alternatively, many) discrete charges, or at a steady rate over an extended period. The desired minimum rate of addition of the initiator to the reaction mixture is selected from:
at least about 0.1%,
alternatively at least about 0.5%,
alternatively at least about 1%,
alternatively at least about 1.2%,
alternatively at least about 1.4%,
alternatively at least about 1.6%,
alternatively at least about 1.8%,
alternatively at least about 2%,
alternatively at least about 2.2%,
alternatively at least about 2.4%,
alternatively at least about 2.6%,
alternatively at least about 2.8%,
alternatively at least about 3%,
alternatively at least about 3.2%,
alternatively at least about 3.4%,
alternatively at least about 3.6%,
alternatively at least about 3.8%,
alternatively at least about 4.0%,
alternatively at least about 4.5%,
alternatively at least about 5%,
alternatively at least about 20%
of the necessary charge of initiator per minute. The initiator can be added at a substantially constant rate, or at a rate which varies with time. Any of the above values can represent an average rate of addition or the minimum value of a rate which varies with time.

The desired maximum rate of addition of the initiator to the reaction mixture is selected from:
at most about 0.1%,
alternatively at most about 0 5%,
alternatively at most about 1%,
alternatively at most about 1.2%,
alternatively at most about 1.4%,
alternatively at most about 16%
alternatively at most about 1.8%,
alternatively at most about 2%,
alternatively at most about 2.2%,
alternatively at most about 2.4%,
alternatively at most about 2.6%,
alternatively at most about 2.8%,
alternatively at most about 3%,
alternatively at most about 3.2%,
alternatively at most about 3.4%,
alternatively at most about 3.6%,
alternatively at most about 3.8%, alternatively at most about 4.0%,
alternatively at most about 4.5%,
alternatively at most about 5%,
alternatively at most about 10%,
alternatively at most about 20%,
alternatively at most about 40%
of the necessary charge of initiator per minute. Any of the above values can represent an average rate of addition or the maximum value of a rate which varies with time.

While the initiator can be added neat, it is preferably cut back with a solvent to avoid high localized proportions of the initiator as it enters the reactor. In a preferred embodiment, it is substantially diluted with the reaction solvent. The initiator can be diluted by at least about 5 times, alternatively at least about 10 times, alternatively at least about 20 times its weight or volume with a suitable solvent or dispersing medium.

After the addition of reactants is completed, the reaction mixture is preferably mixed with heating for an additional 2–120 minutes, to completion. The time required for completion of the reaction can be determined by experiment, by determining when the proportion of nitrogen, or of the grafted monomer in solution, reaches a value at or approaching a minimum preestablished value, or when the viscosity approaches a near constant value.

After the reaction has gone substantially to completion, the heat can be removed and the reaction product can be allowed to cool in the reactor with mixing. Alternatively, more aggressive cooling can be employed, using a heat exchanger or other apparatus. Alternatively, the reaction product may be removed while still at or near reaction temperature.

Grafted Polyolefin Test Methods

% Nitrogen

This test is used to determine the proportions of nitrogen on the grafted polyolefin and on the process fluid. The results of this test are used to determine the degree of grafting.

In order to accurately determine the amount of nitrogen grafted onto the two components in the grafted polyolefin dispersant reaction mixture (which is a mixture of the grafted polymer and process fluid from the grafting reaction), each component of the reaction mixture must be isolated and then individually analyzed, which can be done on an ANTEK Elemental Analyzer. Following the isolation process, the percentage of process fluid entrapped in the extracted polymer must be quantified by gel permeation chromatography (GPC).

Prior to analysis, the reaction mixture must be separated into its individual components—the grafted polyolefin and process fluid. This is accomplished as follows.

Sufficient reaction mixture to give between 0.1% and 0.15% grams grafted polymer is placed in a suitable glass vial. Sufficient heptane is added to give a resulting solution containing approximately 2% polymer solids.

The grafted polyolefin is precipitated from this solution by slowly adding the solution to a beaker containing an excess of acetone. The precipitate is collected and rinsed several times with acetone. Finally, this precipitate is placed on a watch glass and dried at 60° C. in an oven for about 18 hours. This precipitate is hereafter referred to as the "extracted polymer."

The mixture consisting of acetone, heptane and process fluid, or solvent, remaining is then separated. The process fluid or solvent is collected. This sample is hereafter referred to as the "separated process solvent."

After being isolated, these samples, the extracted polymer, and the separated process solvent are then analyzed on the ANTEK Elemental Analyzer (Model 7000 NS) without any further treatment. The total sample response is recorded and the sample area integration is derived from the responses using the Peak Summary Software in the PE Nelson Chromatography software package. The instrument is then calibrated with a suitable standard such as KEMAMIDE (CAS #112-84-5). The calibration is then utilized to convert the sample area integration (i.e. instrument response), referred to above, into the percentage of nitrogen.

Because the "extracted polymer" sample contains some process fluid (this ranges between 5%–30%), the percentage of the process fluid entrapped in the grafted polyolefin must be accurately determined by integrating the process fluid peak in its corresponding GPC chromatogram. This data is then combined with the data from ANTEK Elemental Analyzer to determine the percentage of VIMA (or other nitrogenous monomers) grafted onto the polyolefin and process fluid.

The percentage of nitrogen on the polyolefin can be easily converted to the percentage of grafted. N-vinylimidazole (VIMA) on the polyolefin by dividing by 0.2976 (since VIMA contains 29.76% nitrogen by weight). A similar computation can be used to find the percentage of any other nitrogenous monomer which has been grafted onto the polyolefin backbone.

The amount of unreacted monomer, such as N-vinylimidazole (VIMA), in a polyolefin dispersant is quantified by this method. The peak area ratio of monomer compared to an internal standard, such as n-decane, is determined by Gas Chromatography (GC). The area ratio is converted to a weight ratio by a calibration line. By knowing the amount of the internal standard, it is possible to calculate the weight, and hence the weight fraction, of free monomer in the polyolefin dispersant.

To carry out the test, a gas chromatograph equipped with a flame ionization detector (FID) and a wide bore capillary attachment such as a Perkin Elmer 8500 or equivalent instrument is suitable. The GC column can be a megabore capillary column such as a DB-5 (5%-phenyl-methylpolysiloxane) from J&W Scientific (cat#125-5032). The specifications of this column are: 30 meters long, 0.53 mm ID, 1.5 µm film thickness. Other equivalent equipment which would be suitable is well known to a person skilled in the art.

The calibration line is established by injecting several samples with known weight ratio of monomer to internal standard into GC. The areas under the peaks of monomer and internal standard shown in the chromatograms are integrated. The area ratios of monomer to internal standard versus the weight ratios of monomer to internal standard for the calibration samples—the calibration line—is then plotted. The plot will be a straight line passing through the origin. The slope of the line is then calculated and used for the calculation. The slope was found to be 0.629 for the VIMA-n-decane pair according to the equipment and GC conditions employed.

The polyolefin dispersant is diluted with a suitable solvent, such as toluene, containing the internal standard and subsequently analyzed by GC. Prior to analysis, the GC column must be conditioned at 250° C. for 18 hours with a carrier gas (helium) with a flow rate of 5 cc/min. The samples are injected into the injection port of the GC employed. The peak areas are integrated and the weight and weight fraction of free monomer are calculated as discussed above. The above procedure is known to a person skilled in the art.

ADT Procedure

The ADT test is a test method developed by The Rohm & Haas Co., Philadelphia, Pa., and described in U.S. Pat. No. 4,146,489. The ADT test is used to determine the dispersancy of grafted polyolefin dispersants.

In summary, as described, the method is as follows: A sample of the grafted polyolefin is dissolved in Exxon 130N base oil to give a solution containing 0.25% weight of polyolefin solids. Separately, 10 ml of Exxon 130N base oil is put into each of a series of six test tubes in a test tube rack. 10 ml of the grafted polyolefin dispersant solution is then added to the base oil in the first test tube in the series. The base oil and grafted polyolefin dispersant solution in the first test tube are mixed until homogeneous, giving a solution which contains one half of the concentration of grafted polyolefin dispersant contained in the original solution. From this first tube, 10 ml are decanted and poured into the second tube. The contents of the second tube are further diluted by a factor of 2. This process of sequential dilution is continued through the series of tubes, successively producing solutions with $\frac{1}{4}$, $\frac{1}{8}$, $\frac{1}{16}$, and $\frac{1}{32}$ of the concentration of grafted polyolefin dispersant contained in the first tube. A standardized quantity of sludge solution (as described in U.S. Pat. No. 4,146,489), simulating the sludge in the crankcase of an internal combustion engine, is introduced and mixed well in each of the above prepared solutions. The tubes are allowed to stand at room temperature for 24 hours (or, in some cases, for a shorter or longer period, as indicated in the test results). The tubes of each set are examined in front of a light source to determine which tube is the first in the series to exhibit sediment (fallout), this being associated with sludge which is not successfully dispersed. The ADT result is graded as follows:

| # OF TUBES WITH NO SEDIMENT | FIRST FALLOUT PRESENT IN TUBE # | REPORTED ADT RESULT |
| --- | --- | --- |
| 0 | 1 | FAIL |
| 1 | 2 | 1 |
| 2 | 3 | 2 |
| 3 | 4 | 4 |
| 4 | 5 | 8 |
| 5 | 6 | 16 |
| 6 | — | 32 |
| etc. | etc. | etc. |

The ADT result is reported to the nearest power of two because the concentration of the grafted polyolefin dispersant solution is halved in each successive tube.

Rapid ADT Procedure

The rapid ADT test is an accelerated version of the ADT test method described above. The test is carried out as described for the 24-hour test, except that the test tubes are initially kept in an oven for 90 minutes at 60° C. The tubes are graded in the same manner as before to determine the rapid ADT value of the grafted polyolefin dispersant solution. After this accelerated test, the tubes can be maintained for an additional 24 and 48 hours at room temperature to record longer-term results.

Test Methods

UV/RI Ratio

The materials needed include a grafted polyolefin dispersant sample to be tested, unstabilized tetrahydrofuran (THF), glass vials with screw caps, autosampler vials with TEFLON™ septa and open-top screw caps, an autosampler (if available), a shaker, and disposable pipettes. The equipment used includes a THF reservoir, THF waste containers, a Knauer HPLC Pump 64, a Hitachi 655A-40 Autosampler, two 20 µm particle size Phenogel gel permeation chromatographic (GPC) columns (pore sizes $10^5$ Å and $10^3$ Å) from Phenomenex, a 20 µm particle size Phenogel GPC guard column (pore size $10^5$ Å) from Phenomenex, a Spectroflow 757 Absorbance Detector, a Millipore® Waters Differential Refractometer R40, a PE Nelson 900 Series Interface, and a Digital 386 Computer with PE Nelson chromatography software.

First, a solution containing 0.3% grafted polyolefin dispersant is prepared in unstabilized THF. At the same time, a solution containing 0.3% solids of an appropriate standard is prepared.

The solutions are transferred to vials and sealed using the open-top screw caps and septa. The vials may be arranged on an autosampler, taking note of their sequence.

The flow on the pump is set to 1.2 mL/min. The UV detector is turned on and its wavelength is set to 226 nm. The RI detector is turned on, and its reference cell is flushed with THF for at least ten minutes. Convenient run times are chosen on the computer and/or the autosampler, the analysis is started and the appropriate times are set. The autosampler is then started to begin the analysis. The same procedure is followed to analyze the standard.

Next, the test results are analyzed. The chromatogram contains peaks associated with the polymers and the process fluid. The first peak corresponds with the two polymers; either grafted polymer or standard. After the elution of the polymer peak the chromatogram should return to at least near baseline before the process fluid peak begins to elute.

It is important to make sure that the beginning and end times of the standard and sample polymer peak are similar. Divide the UV area by the RI area of each sample and the standard to obtain a UV/RI ratio. Divide the UV/RI ratio of the sample by the UV/RI ratio of the standard to obtain a relative UV/RI ratio.

Aromatics In the Process Fluid

The aromatics of the process fluids, used in the grafting reactions, are determined by measuring the absorbance over wavelengths ranging from 190 nm to 360 nm for a solution of known concentration. A small amount of test sample is dissolved in cyclohexane (spectroscopic grade) and the spectrum of the test solution is scanned over the above wavelength range. Measurements are carried out at the peak maxima over the ranges of 190–210 nm, 220–240 nm, and 260–280 nm. These positions correspond to the strongest absorption of mono-, di-, and poly-cyclic aromatics. Usually the maxima are located at 203 nm, 226 nm, and 270 nm.

The absorbances at these positions, corrected for the baseline absorbances of the corresponding cell at the corresponding wavelength, are used to calculate the concentrations of mono-, di-, and poly-cyclic aromatics (see below). The aromatics total is the sum of the concentrations of these three aromatic species. In carrying out these calculations, the molar absorptivities of the sample determined at the three specified wavelength ranges are utilized.

Process fluids having aromatics ranging 0–20 wt % are suitable.

Examples are given as follows:
1. High aromatic fluid such as Exxon 100N solvent-treated oil
2. Mobil 100N solvent refined oil
3. Texaco Code 6102 solvent neutral oil 100

The aromatics of the above oils range from 10%–20 wt %

2. Intermediate aromatics fluids 5% to 10%. No direct examples are available but blends of high and low aromatics fluids would be suitable for the process.
3. Low aromatics fluids Hydrotreated oils such as Chevron Rlop, PetroCanada HT 60, HT 100, and HT 160.

The aromatics range from 0.1–5 wt %

4. Aromatics free process fluids Synthetic base stocks such as PAO.

The preferable range of aromatic content is about 0–10 wt %. The most preferable range is about 0–5 wt %.

Lubricating Oil Compositions

The lubricating oil compositions of the present invention preferably comprise the following ingredients in the stated proportions:

A. from about 70% to about 96% by weight, alternatively from about 80% to about 95% by weight, alternatively from about 88% to about 93% by weight, of one or more base oils (including any process fluid carried over from the process for making the graft polyolefin);

B. from about 0.25% solids to about 2% solid by weight, alternatively from about 0.5% solids to about 1.5% solids by weight, alternatively from about 0.8% solids to about 1.2 % solids by weight, alternatively from 0.25% solids by weight to 1.2% solids by weight, or alternatively, from 0.8% solids by weight to 1.5% solids by weight of one or more of the grafted polyolefin made according to this specification (excluding any process oil carried over from the process for making the grafted polyolefin);

C. from about 0.05% solids to 1.0% solids by weight, alternatively from about 0.05% solids to about 0.7% solids by weight, alternatively from about 0.1% solids to about 0.7% solids by weight, of one or more polyolefins other than the graft polyolefins according to the present invention;

D. from 0 to about 15% by weight, alternatively from about 0.5% to about 10% by weight, alternatively from about 0.5% to about 6% by weight, or alternatively from about 0.7% to about 6%, of one or more dispersants which are not a grafted polymers according to the present invention;

E. from about 0.3% to 4% by weight, alternatively from about 0.5% to about 3% by weight, alternatively from about 0.5 to about 2% by weight, of one or more detergents;

F. from about 0.01% to 3% by weight, alternatively from about 0.04% to about 2.5% by weight, alternatively from about 0.06% to about 2% by weight, of one or more anti-wear agents;

G. from about 0.01% to 2% by weight, alternatively from about 0.05% to about 1.5% by weight, alternatively from about 0.1% to about 1% by weight, of one or more antioxidants oxidants; and H. from about 0.0% to 1% by weight, alternatively from about 0.005% to about 0.8% by weight, alternatively from about 0.005% to about 0.5% by weight, of minor ingredients.

The function and properties of each ingredient identified above and exemplary ingredients are specified in the following sections of this specification.

Base oils

Any of the petroleum or synthetic base oils previously identified as process solvents for the graftable polyolefins of the present invention can be used as the base oil. Any other conventional lubricating oils can be used.

Grafted Polymers

The grafted polyolefins according to the present invention contain at least about 13 moles, alternatively at least about 14 moles, alternatively at least about 15 moles, alternatively at least about 16 moles, alternatively at least about 17 moles, alternatively at least about 18 moles, alternatively at least about 19 moles, alternatively at least about 20 moles, alternatively at least about 22 moles, alternatively at least about 24 moles, alternatively at least about 26 moles, alternatively at least about 28 moles, alternatively at least about 30 moles, alternatively at least about 32 moles, alternatively at least about 34 moles, alternatively at least about 36 moles, alternatively at least about 38 moles, alternatively at least about 40 moles, alternatively at least about 50 moles, alternatively at least about 60 moles, alternatively at least about 70 moles, alternatively at least about 80 moles, alternatively at least about 90 moles, alternatively at least about 100 moles, alternatively at least about 120 moles of grafted monomer per mole of the original polymer, and at least about 11.2 % by weight of grafted moieties.

The molecular weight of the grafted polymer is comparable to that of the ungrafted polymer from which it is made.

The grafted polymers can be used in place of part or all of the viscosity index improving polymers conventionally used in such formulations. They can also be used in place of part or all of the dispersants conventionally used in such formulations, as they help keep in suspension the impurities which develop in lubricating oils during use.

The use of the present grafted polyolefins has important formulation advantages.

The formulations containing the present highly-grafted dispersant polymers have many significant advantages. The low-temperature viscosity increase normally caused by the presence of conventional dispersants is largely eliminated. This allows higher-viscosity (thus less expensive and less-volatile) base oils to be used. Another advantage of the present invention is that the highly VIMA-grafted polymer is much less expensive than the conventional dispersants. This means that the formulations of the present invention are more economical than prior formulations which use less-grafted polyolefins and more conventional dispersants.

Moreover, an improvement in wear is achieved when the present invention is used and the amount of the conventional dispersant is reduced. The present inventors believe that the anti-wear ingredients used in the formulations of Examples 22 and 23 are better able to function when little of the dispersant is present. Dispersants interact with the anti-wear agents and compete with them for sites on the parts being lubricated, thus reducing their effectiveness.

In addition, because of the low viscosity they impart to lubricating oils, a relatively large amount of the grafted polymers can be incorporated in base oils having low volatile content and a consequently high initial viscosity. The resulting lubricating oil composition can be formulated to a desired viscosity specification (e.g. 10W-30) with a reduced volatile content.

Another formulation advantage is that the amount of a separate dispersant can be reduced, making room for more of the grafted polymer, more base oil, or both.

The grafted polymers of the prior art can also be used herein in combination with the grafted polymers according to the present invention. Previously known grafted polymers, some of which also may displace part of other dispersing agents, include those disclosed in U.S. Pat. No. 4,092,255, col. 1, lines 47–53: graft polyolefins resulting from the grafting of acrylonitrile or aminoalkyl methacrylates on amorphous polyolefins of ethylene and propylene, or also polymers obtained by radical polymerization of acrylates or alkyl methacrylates with vinyllactams such as N-vinylpyrrolidone or aminoalkyl methacrylates.

Others grated polymers useful herein include those disclosed in U.S. Pat. No. 4,092,255, col. 2, line 1, to col. 5, line 12, which is hereby incorporated herein by reference. The constituents of those grafted polymers (polymers, initiators, and graft monomers) can also be used to prepare the grafted polymers according to the present invention.

Non-grafted polymers

Any of the conventional viscosity index improving polymers can be used in the formulations according to the present invention. These are conventionally long-chain polymers, and are largely polyolefins. Exemplary polymers contemplated for use herein include those suggested by U.S. Pat. No. 4,092,25, col. 1, lines 29032: polyisobutene, polymethacrylates, polyalkylstyrenes, partially hydrogenated copolymers of butadiene and styrene, and amorphous polyolefins of ethylene and propylene.

Dispersants

Dispersants maintain oil insolubles, resulting from oxidation during use, in suspension in the fluid, thus preventing sludge flocculation and precipitation or disposition on metal parts. Suitable dispersants include high molecular weigh alkyl succinimides, the reaction product of oil-soluble polyisobutylene succinic anhydride with ethylene amines such as tetraethylene pentamine and borated salts thereof.

Such conventional dispersants are also contemplated for use herein, although frequently they can be used in a reduced quantity when the grafted polymers according to the present invention are also used. Exemplary dispersants include those listed in U.S. Pat. No. 4,092,255, col. 1, lines 38–41: succinimides or succimic esters, alkylated by a polymer of isobutene or propylene, on the carbon in alpha position of the succinimide carbonyl. These additives are typically particularly useful during cold running of an engine or other machinery being lubricated.

Detergents

Detergents and metal rust inhibitors include the metal salts of sulphonic acids, alkyl phenols, sulfurized alkyl phenols, alkyl salicylates, napthenates, and other soluble mono- and dicarboxylic acids. Highly basic (vis, overbased) metal sales, such as highly basic alkaline earth metal sulfonates (especially Ca and Mg salts) are frequently used as detergents. Such detergents are particularly useful for keeping the slurry of particulate insoluble materials in suspension in the oil when the engine or other machinery being lubricated is hot. Other exemplary detergents contemplated for use herein include those recited in U.S. Pat. No. 4,092,255, col. 1, lines 35–36: sulfonates, phenates, or organic phosphates of polyvalent metals.

Anti-wear agents

Anti-wear agents, as their name implies, reduce wear of metal parts. Representatives of conventional anti-wear agents are zinc dialkyldithiophosphate and zinc diaryldithiosphate.

Anti-oxidants

Oxidation inhibitors, or anti-oxidants, reduce the tendency of mineral oils to deteriorate in service which deterioration can be evidenced by the products of oxidation such as sludge and varnish-like deposits on the metal surfaces, and by viscosity growth. Such oxidation inhibitors include alkaline earth metal salts of alkylphenolthioesters having preferably $C_5$ to $C_{12}$ alkyl side chains, e.g., calcium nonylphenol sulfide, bariu toctylphenyl sulfide, dioctylphenylamine, phenylalphanaphthlamine, phospho- sulfurized or sulfurized hydrocarbons, etc.

Pour Point Depressants

Pour point depressants, otherwise known as lube oil flow improvers, lower the temperature at which the fluid will flow or can be poured. Such additives are well known. Typically of those additives which usefully optimize the low temperature fluidity of the fluid are $C_8$–$C_{18}$ dialkylfumarate vinyl acetate copolymers, polymethacrylates, and wax napthalene.

Minor Ingredients

Many minor ingredients which do not prevent the use of the present compositions as lubricating oils are contemplated herein. A non-exhaustive list of other such additives includes rust inhibitors, as well as extreme pressure additives, friction modifiers, antifoam additives, and dyes.

WORKING EXAMPLES

Example 1

Laboratory Preparation of Grafted Polyolefin 500 g of a polymer solution were placed in a resin kettle. The polymer solution consisted of 12.50 weight % DuPont ORTHOLEUM 2053 in Petrocanada 160N. This solution was heated with an electric heating mantle to 190° C. During heating the solution was purged with an inert gas ($CO_2$) fed below the surface of the polymer solution. When the solution reached 190° C. the $CO_2$ purge was diverted to flow over the surface at a rate of 80 cc/min.

With the polymer solution at 190° C., 1.00% by weight of n-vinylimidazole (by weight of the polymer solution) was added over a one minute period. After thoroughly mixing the monomer with the polymer solution (about 2 minutes), 0.20% initiator (DTBP by weight of the polymer solution) was added over a thirty minute period. The resulting reaction mixture was allowed to mix with heating for an additional sixty minutes after the thirty minutes initiator addition.

These reaction conditions and properties of the resulting reaction products are given in Table 1.

Example 2

Laboratory preparation of Grafted Polyolefin

The grafting reaction was carried out in the same manner as in Example 1, with the following changes. The weight of polymer solution was increased from 500 g to 1600 g.

Example 3

Laboratory Preparation of Grafted Polyolefin

The grafting reaction was carried out in the same manner as in Example 1, with the following changes. The reaction temperature was reduced to 170° C. The addition times of the monomer and initiator were increased to sixty minutes. The reaction time after monomer and initiator addition was reduced to thirty minutes.

Example 4

Laboratory Preparation of Grafted polyolefin

The grafting reaction was carried out in the same manner as in Example 1, with the following changes. The addition times of the monomer and initiator were increased to sixty minutes. The reaction time after monomer and initiator addition was reduced to thirty minutes.

Example 5

Laboratory Preparation of Grafted Polyolefin

The grafting reaction was carried out in the same manner as in Example 1, with the following changes. The addition times of the monomer and initiator were increased to sixty minutes. The reaction temperature was reduced to 170° C. The monomer was reduced to 0.70 weight % of the polymer solution. The initiator was reduced to 0.15 weight % of the polymer solution. The reaction time after the additions was reduced to thirty minutes.

Example 6

Laboratory Preparation of Grafted Polyolefin

The grafting reaction was carried out in the same manner as in Example 1, with the following changes. The addition times of the monomer and initiator were increased to sixty minutes. The reaction temperature was reduced to 170° C. The monomer was reduced to 0.70 weight % of the polymer solution. The initiator was reduced to 0.15 weight % of the polymer solution. The reaction time after the additions was reduced to thirty minutes.

Example 7

Laboratory Preparation of Grafted Polyolefin

The grafting reaction was carried out in the same manner as in Example 1, with the following changes. The addition times of the monomer and initiator were increased to sixty minutes. The reaction temperature was reduced to 170° C. The reaction time after the additions was reduced to thirty minutes. The polymer used was changed to a polyolefin manufactured by MITSUI.

Example 8

Laboratory Preparation of Grafted Polyolefin

The grafting reaction was carried out in the same manner as in Example 7, with the following changes. The monomer was reduced from 1.0 to 0.80 weight % of the polymer solution.

Example 9

Laboratory Preparation of Comparative Grafted Polyolefin

The grafting reaction was carried out in the same manner as in Example 1, with the following changes. The process fluid was changed to Chevron 100N. The monomer was reduced to 0.30 weight % of the polymer solution. The initiator was reduced to 0.10 weight % of the polymer solution. The reaction temperature was reduced to 170° C.

Example 10

Pilot Plant Preparation of Grafted Polyolefin 30.0 kg of a polymer solution was placed in a reactor. The polymer solution consisted of 12.50 weight % DuPont ORTHOLEUM 2053 in Petrocanada 160N. This solution was heated with an oil recirculation system to 180° C. During the initial stages of heating, the solution was blanketed with an inert gas ($CO_2$). After 5 minutes, the gas flow was stopped and the reactor sealed.

With the polymer solution at 180° C., 1.00% by weight of n-vinylimidazole (by weight of the polymer solution) was added over a one minute period. After thoroughly mixing the monomer with the polymer solution (20 minutes), 0.20% initiator (DTBP by weight of the polymer solution) was added over a thirty minute period. The resulting reaction mixture was allowed to mix with heating for an additional sixty minutes after the thirty minute initiator addition.

Example 11

Pilot Plant Preparation of Grafted Polyolefin

The grafting reaction was carried out in the same manner as in Example 10, with the following changes. The reaction temperature was reduced to 170° C. The addition times of the monomer and initiator were increased to sixty minutes. The reaction time after the additions was increased to 180 minutes.

Example 12

Pilot Plant Preparation of Grafted Polyolefin

The grafting reaction was carried out in the same manner as in Example 10, with the following changes. The addition times of the monomer and initiator were increased to sixty minutes. The reaction temperature was reduced to 170° C. The monomer was reduced to 0.70 weight % of the polymer solution. The initiator was reduced to 0.15 weight % of the polymer solution.

Example 13

Pilot Plant Preparation of Comparative Grafted Polyolefin

The grafting reaction was carried out in the same manner as in Example 10, with the following changes. The monomer was reduced to 0.28 weight % of the polymer solution. The initiator was reduced to 0.07 weight % of the polymer solution. The reaction temperature was reduced to 170° C.

Example 14

Preparation of Grafted Polyolefin 4430 gallons (31550 pounds, 14,311 kg, 15.77 tons) of polymer solution, purged with $CO_2$ gas, containing 12.5 wt % Ortholeum 2053 dissolved in P160N were transferred into a 5600 gallon well stirred reactor. A $CO_2$ gas blanket was maintained in the reactor. The material was heated to 170 ° C. under the $CO_2$ blanket. At that temperature, the monomer was fed into the reactor, and a 20:1 blend of P100N and initiator was fed into the recirculation (mixer) line. For this reaction, 26.2 gallons (227 pounds, 103 kg) of monomer, which corresponds to 0.72 wt % of the polymer solution, were fed through the top of the reactor at an addition rate 3.78 pounds/min (0.0286 kg/sec, 0.012 wt %/min). This reaction also required 7.34 gallons (49 pounds, 22.2 kg) of initiator, which corresponds to 0.155 wt % of the polymer solution, were diluted with 137.5 gallons (979 pounds, 444 kg, dilution factor 20) of P100N base oil, and fed through an inlet to the bottom of the reactor at an addition rate 0.817 pounds/min ( 0.0062 kg/sec, 0.0026 wt %/min). The temperature was maintained at about 1.69.5 ° C. (setpoint at 170 ° C.) throughout the reaction.

The mixture was allowed to react for 90 minutes after all reactants had been introduced. Upon completion, the mixture was transferred to a product holding tank.

Example 15

Preparation of Grafted Polyolefin

The reaction was carried out according to Example 14, with the following change. The post feed reaction time was reduced from 90 minutes to 15 minutes, after which the reactants were transferred out of the reactor.

Example 16

Preparation of comparative Grafted Polyolefin

The reaction was carried out according to Example 14, with the following changes. The process fluid was changed to P100N base oil. 81.3 pounds of VIMA, corresponding to 0.25 wt % of the polymer solution, was introduced into the reactor all at once. Sufficient time (about 20–30 minutes) was allowed to permit dispersion of the monomer throughout the reactor. The initiator quantity was reduced from 49 pounds to 18.9 pounds. The latter, which correspond to 0.06 wt % of the polymer solution, was diluted with 378 pounds of P100N base oil, and was introduced into the reactor over 30 minutes at a uniform rate of 0.63 pounds/min (0.0048 kg/sec, 0,002 wt %/min). Reaction was complete 60 minutes after all initiator had been introduced.

Examples 17:

Alternate Reaction Components

The experiments of Examples 1–16 are repeated, using conditions similar to those of the previous Examples, with each possible combination of the solvents, polymers, monomers, and initiators identified earlier in this application. Graft polymers are formed which have utility for increasing the viscosity index of a lubricating oil.

Examples 18–21

Preparation Of Lubricating Oil Compositions

To demonstrate the formulation flexibility permitted by the present invention, SAE 10W-30 lubricant formulations having the ingredients set out in Table 2 were prepared as Examples 18–21. The DI package used in the formulation was similar to a commercial automotive lubrication oil DI package. Included in this package is 1% of a commercially available dispersant, as well as an anti-oxidant, a detergent, an anti-wear agent, and a pour point depressant. The VII polymer used was a conventional non-dispersant viscosity index improver, provided as 13.1% solids in a base oil solvent.

The VIMA grafted polyolefin "A" used in Examples 19 and 20 was a conventional grafted polyolefin with a mole ratio of N-vinylimidazole of 9.6 moles per mole of polymer. That is, a weight percent of vinylimidazole in the polymer of 0.9. This is outside the scope of the present invention which requires a mole ratio above 13.

The VIMA grafted polyolefin "B" used in Example 21 was produced according to this invention and had a mole ratio of 33 moles of monomer to each mole of polymer or 3.0% by weight, which is greater than the minimum values for a molar ratio of 13 and for weight percent of 1.2 which define the scope of the present invention.

Example 18 is a comparative example in which no grafted polyolefin is used and conventional dispersants are employed. Examples 19 and 20 are comparative examples using a VIMA-grafted polyolefin outside the scope of the present invention. Example 21 uses a VIMA grafted polyolefin according to the present invention.

In Examples 19–21, the polyolefin solids (ungrafted VII polyolefin plus grafted polyolefins) were comparable.

Referring to Table 2, the formulations of Examples 18–21 have been optimized so these lubrication blends each ? have the typical dispersancy and viscosity characteristics of a 10W-30 grade lubricating oil.

In Example 18, the necessary dispersancy was provided by using a total of 6% by weight of dispersant (1% contributed by the dispersant/inhibitor package and 5% added directly). The oil was kept within grade by using a low-viscosity base oil (5 cSt) and a relatively large amount of a VII polymer (exceeding 7 wt %).

In Examples 19 and 20, most of the ungrafted VII polymer and some of the total dispersant were replaced by a VIMA-grafted polyolefin (dispersant polyolefin) containing less VIMA than the present invention requires. In Example 21, very little—25%—of the conventional dispersant of Example 18 remains.

One advantage of the formulation of Example 21 is that the low-temperature viscosity increase normally caused by the presence of conventional dispersants is largely eliminated. This allows higher-viscosity (thus less expensive and less-volatile) base oils to be used in blending of the 10W-30 formulation. Another advantage of the present invention is that the VIMA-grafted polyolefin is much less expensive than the conventional dispersants. This means that formulations containing the present invention are more economical than prior formulations which use less-grafted polymers and conventional dispersants.

Examples 22–23

Engine Testing Data

The compositions in Table 3 were prepared and engine tested using ASTM Sequence VE test. The VIMA-grafted polyolefin used in Example 22 was one having a mole ratio of VIMA to the starting polymer of 8.0, and 0.75% by weight VIMA. Since the grafted polyolefin of Example 22 had a mole ratio of less than about 13:1 and contained less than about 1.2% by weight VIMA, it was outside the scope of the present invention. The VIMA-grafted polyolefin used in Example 23 used a VIMA-grafted polyolefin having a mole ratio of VIMA to the starting polymer of 35, and 3.2% by weight VIMA. Since the grafted polyolefin of Example 23 had a mole ratio of at least about 13:1 and contained at least about 1.5% by weight VIMA, it was within the scope of the grafted polyolefins of the present invention.

The amount of dispersant used in Example 23, according to the present invention, is ¼ that of Example 22. Yet, the finest four test results (reported in Table 3), addressing cleanliness (dispersancy), namely rocker arm cover sludge, average engine sludge, piston skirt varnish, and average engine varnish, were higher (better) for Example 23, according to the present invention, than for Example 22 which used a less highly grafted polyolefin (dispersant). Thus, the present invention provides superior dispersancy using a small fraction of the otherwise-necessary dispersant.

Moreover, the wear tests illustrate an improvement in wear when the present invention is used and the amount of the conventional dispersant is reduced. For the average cam wear and maximum cam wear tests of Table 3, a lower number represents less wear and thus a better result.

The present inventors believe that the anti-wear ingredients used in the formulations of Examples 22 and 23 are better able to function when little of the dispersant is present. Dispersants can interact with the anti-wear agents and also compete with them for sites on the parts being lubricated, thus reducing their effectiveness. Table 3 thus illustrates that the use of the present invention to provide dispersancy, in place of conventional dispersants, provides the necessary dispersancy and better anti-wear performance.

TABLE 1

| CONDITIONS and RESULTS | EXAMPLE | | | | | | | | |
|---|---|---|---|---|---|---|---|---|---|
| | 1 | 2 | 3 | 4 | 5 | 6 | 7 | 8 | 9 |
| SOLVENT: | P160N | P160N | P160N | P160N | P160N | P160N | P160N | P160N | RLOP |
| POLYMER: | 2053 | 2053 | 2053 | 2053 | 2053 | 2053 | VSNX | VSNX | 2053 |
| WT %: | 12.5 | 12.5 | 12.5 | 12.5 | 12.5 | 12.5 | 12.5 | 12.5 | 12.5 |
| RXN TEMP (°C.): | 190 | 190 | 170 | 190 | 170 | 170 | 170 | 170 | 170 |
| MONOMER: | VIMA | VIMA | VIMA | VIMA | VIMA | VIMA | VIMA | VIMA | VIMA |
| WT %: | 1.0 | 1.0 | 1.0 | 1.0 | 0.7 | 0.7 | 1.0 | 0.8 | 0.3 |
| ADD TIME, MIN.: | 1 | 1 | 60 | 60 | 60 | 60 | 60 | 60 | 1 |
| INITIATOR: | DTBP | DTBP | DTBP | DTBP | DTBP | DTBP | DTBP | DTBP | DTBP |
| WT %: | 0.20 | 0.20 | 0.20 | 0.20 | 0.15 | 0.15 | 0.20 | 0.20 | 0.10 |
| ADD TIME, MIN.: | 30 | 30 | 60 | 60 | 60 | 60 | 60 | 60 | 30 |
| MIX TIME, MIN.: | 60 | 60 | 30 | 30 | 30 | 30 | 30 | 30 | 60 |
| VIS INCREASE, %: | 267 | 370 | 224 | 192 | 153 | 156 | 22 | 4 | 33 |
| ADT: | 16 | 8 | 16 | 16 | 16 | 16 | 16 | 16 | 4 |
| N2, %: | 1.53 | 1.54 | 0.78 | 0.55 | 0.37 | 0.48 | 0.67 | 0.60 | 0.22 |
| GRAFT, WT %: | 5.14 | 5.16 | 2.62 | 1.84 | 1.24 | 1.61 | 2.25 | 2.02 | 0.74 |
| GRAFT, MOL RATIO: | 57.5 | 57.9 | 28.6 | 19.9 | 13.3 | 17.4 | 24.4 | 21.9 | 7.92 |

| CONDITIONS and RESULTS | EXAMPLE | | | | | | |
|---|---|---|---|---|---|---|---|
| | 10 | 11 | 12 | 13 | 14 | 15 | 16 |
| SOLVENT: | P160N | P160N | P160N | P160N | P160N | P160N | P100N |
| POLYMER: | 2053 | 2053 | 2053 | 2053 | 2053 | 2053 | 2053 |
| WT %: | 12.5 | 12.5 | 12.5 | 12.5 | 12.5 | 12.5 | 12.5 |
| RXN TEMP (°C.): | 180 | 170 | 170 | 170 | 170 | 170 | 170 |
| MONOMER: | VIMA | VIMA | VIMA | VIMA | VIMA | VIMA | VIMA |
| WT %: | 1.0 | 1.0 | 0.7 | 0.28 | 0.7 | 0.7 | 0.25 |
| ADD TIME, MIN.: | 1 | 60 | 60 | 1 | 60 | 60 | 0 |
| INITIATOR: | DTBP | DTBP | DTBP | DTBP | DTBP | DTBP | DTBP |
| WT %: | 0.20 | 0.20 | 0.15 | 0.07 | 0.15 | 0.15 | 0.06 |
| ADD TIME, MIN.: | 30 | 60 | 60 | 30 | 60 | 60 | 30 |
| MIX TIME, MIN.: | 60 | 180 | 60 | 60 | 90 | 15 | 60 |
| VIS INCREASE, %: | 579 | 454 | 245 | 65 | 246 | 209 | 52 |
| ADT: | 8 | 16 | 16 | 4 | 16 | 16 | 4 |
| N2, %: | 1.78 | 1.02 | 0.59 | 0.18 | 0.89 | 0.96 | 0.22 |
| GRAFT, WT %: | 5.98 | 3.43 | 1.97 | 0.61 | 3.00 | 3.22 | 0.75 |
| GRAFT, MOL RATIO: | 67.6 | 37.8 | 21.4 | 6.56 | 32.9 | 35.4 | 8.01 |

TABLE 2

| INGREDIENT (WT. %) | SAE 10W-30 FORMULATIONS EXAMPLE | | | |
|---|---|---|---|---|
| | 18 | 19 | 20 | 21 |
| Lubricant Base Oil: | | | | |
| Exxon 130N | 69.75 | — | — | — |
| Exxon 150N LP | — | 82.55 | 77.20 | 73.87 |
| Exxon 330N | 12.40 | — | 5.60 | 10.00 |
| DI Package | 5.30 | 5.30 | 5.30 | 5.30 |
| Dispersant | 5.00 | 3.00 | 3.00 | 0.50 |
| Pour Point Depressant: | 0.10 | 0.10 | 0.10 | 0.10 |
| VII Polymer | 7.45 | 2.10 | 1.85 | 0.50 |
| VIMA-Grafted Polyolefins: | | | | |
| A (outside present invention: | — | 6.95 | 6.95 | — |
| B (per present invention) | — | — | — | 9.73 |
| Total Weight | 100.0 | 100.0 | 100.0 | 100.0 |
| Total Base Oil | 82.15 | 82.55 | 82.80 | 83.87 |
| Total Dispersant | 6.00 | 4.00 | 4.00 | 1.50 |
| Total Polymer | 0.976 | 0.985 | 0.95 | 0.937 |
| Solids: | | | | |
| Base Oil Viscosity, cSt | 5.0 | 5.2 | 5.35 | 5.46 |
| Kinematic Vis @ 100° C., cSt | 11.80 | 11.70 | 11.76 | 11.75 |
| CCS @ 20° C., P | 29.30 | 27.50 | 31.30 | 30.90 |
| Ravenfield HT/HS, cP | 3.51 | 3.33 | — | 3.33 |
| Noack, % Wt Loss | 20.15 | 18.68 | 18.20 | 17.20 |

TABLE 3

| Engine Test Data INGREDIENT (Wt. %) | EXAMPLE | |
|---|---|---|
| | 22 | 23 |
| Base oil | 78.4 | 82.10 |
| VII Polymer | 7.60 | 2.80 |
| VIMA-grafted polyolefin solution A[1] | 5.50 | — |
| VIMA-grafted polyolefin solution B[2] | — | 10.00 |

TABLE 3-continued

| Engine Test Data | EXAMPLE | | |
|---|---|---|---|
| INGREDIENT (Wt. %) | 22 | 23 | |
| Detergent | 2.70 | 2.40 | |
| Anti-Wear agent | 1.30 | 1.15 | |
| Anti-oxidant | 0.40 | 0.44 | |
| Pour point depressant | 0.10 | 0.10 | |
| Dispersant | 4.00 | 1.00 | |
| Total | 100.0 | 100.0 | |
| ASTM Sequence VE Test Results | | | Requirement |
| Rocker Arm Cover Sludge | 8.01 | 9.14 | ≧7.0 |
| Average Engine Sludge | 8.26 | 9.37 | ≧9.0 |
| Piston Skirt Varnish | 6.78 | 6.89 | ≧6.5 |
| Average Engine Varnish | 5.97 | 6.62 | ≧5.0 |
| Average Cam Wear | 10.59 | 0.16 | ≦5.0 |
| Maximum Cam Wear | 21.4 | 0.20 | ≦15 |

[1]VIMA/polymer molar ratio = 8.0 (comparative example)
[2]VIMA/polymer molar ratio = 32.9 (present invention)

What is claimed is:

1. A graft copolymer having at least about 13 moles of N-vinylimidazole grafts per mole of an ethylenic polymer backbone, said graft copolymer having a weight average molecular weight of from about 20,000 to about 500,000 and a polydispersity of less than about 10.

2. The graft copolymer of claim 1, which has the property of increasing the viscosity index of a lubricating base oil stock by at least about 20 points when present at a level of 1% by weight in the base oil stock.

3. A graft copolymer of at least about 2% by weight of N-vinylimidazole on an ethylenic polymer backbone.

4. A lubricating oil comprising:
  A. a lubricant base oil; and
  B. as a viscosity index improver, the graft copolymer of claim 1, present in an amount sufficient to raise the viscosity index of said base stock by at least about 20 points.

5. A 10W-30 lubricating oil comprising:
  A. more than about 80% by weight of a lubricant base oil having a volatile content of less than about 19% and a viscosity at 100° C. exceeding about 5 centistokes;
  B. from about 1% to about 10% by weight of a graft copolymer of at least about 13 moles of N-vinylimidazole per mole of an ethylenic polymer backbone; and
  C. from 0% to about 9% by weight of an ungrafted dispersant polymer; wherein said lubricating oil comprises more than about 90% by weight of said lubricant base oil, graft copolymer, and ungrafted dispersant polymer.

6. A method of making a dispersant viscosity index improver, comprising the steps of:
  A. providing (i) an ethylenic polymer having graftable unsaturation, (ii) more than about 13 moles of N-vinylimidazole per mole of said ethylenic polymer, and (iii) an amount of an initiator sufficient to graft at least about 13 moles of N-vinylimidazole per mole of said ethylenic polymer;
  B. dissolving said ethylenic polymer in a solvent, forming a solution;
  C. dispersing said N-vinylimidazole in said solution; and
  D. adding said initiator to said solution at an average rate of addition of less than about 20% of the amount sufficient to graft said N-vinylimidazole to said polymer per minute of addition, said adding step being carried out at a temperature exceeding the initiation temperature of said initiator;

thereby forming a graft copolymer having at least about 13 moles of N-vinylimidazole per mole of said ethylenic polymer, said graft copolymer having a viscosity of less than about 13,000 centistokes at 100° C.

7. The method of claim 6, wherein said solvent comprises a lubricant base stock.

8. The method of claim 7, wherein said lubricant base stock contains less than about 9% by weight of reactive aromatic constituents.

9. The method of claim 7, wherein said step of dispersing said N-vinylimidazole in said solution is carried out, while adding said initiator to said solution, at a rate of addition of less than about 20% of the charge of said N-vinylimidazole per minute of addition.

10. The product produced by the process of claim 6.

11. The graft reaction product of a monomer selected from the group consisting of:

N-vinylimidazole;
  1-vinyl-2-pyrrolidinone;
  N-vinyl imidazole;
  N-allyl imidazole;
  1-vinyl pyrrolidone;
  2-vinyl pyridine;
  4-vinyl pyridine;
  N-methyl-N-vinyl-acetamide;
  di-allyl formamide;
  N-methyl-N-allyl formamide;
  N-ethyl-N-allyl formamide;
  N-cyclohexyl-N-allyl formamide;
  4-methyl-5-vinyl thiazole;
  N-allyl di-iso-octyl phenothiazine;
  2-methyl-1-vinylimidazole
  3-methyl-1-vinylpyrazole
  N-vinyl-purine
  N-vinyl piperazines
  N-vinyl succinimide
  Vinylpiperidines
  Vinylmorpholines and combinations of those materials grafted on an ethylenic polymer backbone, said graft copolymer having a weight average molecular weight of from about 20,000 to about 500,000 and a molar proportion of grafted monomer to the final polymer of at least about 13:1.

12. The graft reaction product of a nitrogenous, ethylenically unsaturated, aliphatic or aromatic monomer having from 2 to about 50 carbon atoms grafted on an ethylenic polymer backbone, said graft copolymer having a weight average molecular weight of from about 20,000 to about 500,000 and a molar proportion of grafted monomer to the final polymer of at least about 13:1.

13. The method of claim 7, wherein said lubricant base stock contains less than about 15% by weight of reactive aromatic constituents.

* * * * *